(12) United States Patent
Menon et al.

(10) Patent No.: US 12,355,939 B2
(45) Date of Patent: Jul. 8, 2025

(54) CONTENT-ADAPTIVE ENCODER PRESET PREDICTION FOR ADAPTIVE LIVE STREAMING

(71) Applicant: Bitmovin GmbH, Klagenfurt am Wörthersee (AT)

(72) Inventors: Vignesh V. Menon, Klagenfurt am Wörthersee (AT); Hadi Amirpour, Klagenfurt am Wörthersee (AT); Christian Timmerer, Klagenfurt am Wörthersee (AT)

(73) Assignee: Bitmovin GmbH, Klagenfurt am Wörthersee (AT)

( * ) Notice: Subject to any disclaimer, the term of this patent is extended or adjusted under 35 U.S.C. 154(b) by 141 days.

(21) Appl. No.: 18/367,234

(22) Filed: Sep. 12, 2023

(65) Prior Publication Data

US 2024/0098247 A1    Mar. 21, 2024

Related U.S. Application Data

(60) Provisional application No. 63/406,136, filed on Sep. 13, 2022.

(51) Int. Cl.
*H04N 19/103* (2014.01)
*H04N 19/14* (2014.01)
(Continued)

(52) U.S. Cl.
CPC .......... *H04N 19/103* (2014.11); *H04N 19/14* (2014.11); *H04N 19/42* (2014.11);
(Continued)

(58) Field of Classification Search
CPC ...... H04N 19/103; H04N 19/14; H04N 19/42; H04N 19/2187
See application file for complete search history.

(56) References Cited

U.S. PATENT DOCUMENTS 10,104,413 B2    10/2018 Phillips et al.
10,499,081 B1    12/2019 Wang et al.
(Continued)

OTHER PUBLICATIONS

Bentaleb et al., "A Survey on Bitrate Adaptation Schemes for Streaming Media Over HTTP,", IEEE Communications Surveys & Tutorials, vol. 21, No. 1, 2019, pp. 562-585.
(Continued)

*Primary Examiner* — On S Mung
(74) *Attorney, Agent, or Firm* — Marton Ribera Schumann & Chang LLP; Chien-Ju Alice Chuang (57) ABSTRACT

Techniques for content-adaptive encoder preset prediction for adaptive live streaming are described herein. A method for content-adaptive encoder preset prediction for adaptive live streaming includes performing video complexity feature extraction on a video segment to extract complexity features such as an average texture energy, an average temporal energy, and an average lumiscence. These inputs may be provided to an encoding time prediction model, along with a bitrate ladder, a resolution set, a target video encoding speed, and a number of CPU threads for the video segment, to predict an encoding time, and an optimized encoding preset may be selected for the video segment by a preset selection function using the predicted encoding time. The video segment may be encoded according to the optimized encoding preset.

19 Claims, 5 Drawing Sheets

(51) Int. Cl.
   *H04N 19/42* (2014.01)
   *H04N 21/2187* (2011.01)
   *H04N 21/234* (2011.01)
   *H04N 21/845* (2011.01)

(52) U.S. Cl.
   CPC ... *H04N 21/2187* (2013.01); *H04N 21/23418* (2013.01); *H04N 21/8456* (2013.01)

(56) References Cited

U.S. PATENT DOCUMENTS

| | | |
|---|---|---|
| 2010/0189183 A1 | 7/2010 | Gu et al. |
| 2011/0305273 A1 | 12/2011 | He et al. |
| 2012/0147958 A1 | 6/2012 | Ronca |
| 2013/0089142 A1 | 4/2013 | Begen et al. |
| 2013/0282917 A1 | 10/2013 | Reznik et al. |
| 2016/0073106 A1 | 3/2016 | Su |
| 2016/0134881 A1 | 5/2016 | Wang |
| 2017/0078686 A1 | 3/2017 | Coward et al. |
| 2018/0014050 A1 | 1/2018 | Phillips et al. |
| 2018/0338146 A1 | 11/2018 | John |
| 2019/0028745 A1 | 1/2019 | Katsavounidis |
| 2019/0075301 A1 | 3/2019 | Chou et al. |
| 2020/0412784 A1 | 12/2020 | Yamagishi et al. |
| 2022/0408097 A1* | 12/2022 | Lin ............ H04N 19/136 |

OTHER PUBLICATIONS

Jain et al., "Throughput Fairness Index: An Explaination", 1984, pp.—13.

Mehrabi et al., "Edge Computing Assisted Adaptive Mobile Video Streaming", IEE Transactions on Mobile Computing, vol. 18, No. 4, Apr. 2019, pp. 787-800.

Lederer et al., "Dynamic Adaptive Streaming over HTTP Dataset", Proceedings of the 3rd Multimedia Systems Conference, Feb. 2012, pp. 89-94.

Ericsson, "Ericsson Mobility Report", Nov. 2019, pp. 1-36.

ETSI, "Mobile Edge Computing A Key Technology Towards 5G", ETSI White Paper No. 11, Sep. 2015, pp. 1-16.

Nguyen et al., "Adaptation Method for Video Streaming over HTTP/2", IEICE Communications Express Comex, vol. 1, pp. 1-6, https://www.researchgate.net publication/292213198_Adaptation_Method_for_Video_Streaming_over_HTTP2).

3GPP "3GPP TS 26.247. Progressive Download and Dynamic Adaptive Streaming over HTTP (3GP-DASH)", 2015, pp. 1, https://portal.3gpp.org/desktopmodules/Specifications/SpecificationDetails.aspx?specificationId=1444.

Gernot Zwantschko, "What is Per-Title Encoding? How to Efficiently Compress Video", BITMOVIN, pp. 1-14, https://bitmovin.com/per-title-encoding/.

V.V Menon et al., "Efficient Content-Adaptive Feature-Based Shot Detection for HTTP Adaptive Streaming" IEEE, May 20, 2021, pp. 1-2, https://www.youtube.com/watch?v=jkA1R0shpTc.

Liu et al., "Video Super-Resolution Based on Deep Learning: A Comprehensive Survey", arXiv:2007.12928v3 [cs.CV], Mar. 16, 2022, pp. 1-33.

Jon Dahl, "Instant Per-Title Encoding", MUX, Apr. 17, 2018, pp. 1-8, https://mux.com/blog/instant-per-title-encoding/.

Ledig et al., "Photo-Realistic Single Image Super-Resolution Using a Generative Adversarial Network", arXiv:1609.04802, May 25, 2017, pp. 1-19, http://arxiv.org/abs/1609.04802.

Mishra et al., "A Survey on Deep Neural Network Compression: Challenges, Overview, and Solutions", arXiv:2010.03954, Oct. 5, 2020, pp. 1-19, https://arxiv.org/abs/2010.03954.

Li et al., "Toward A Practical Perceptual Video Quality Metric", Netflix Technology Blog, Jun. 5, 2016, pp. 1-23, https://netflixtechblog.com/toward-a-practical-perceptual-video-quality-metric-653f208b9652.

Menon et al., "ETPS: Efficient Two-pass Encoding Scheme for Adaptive Live Streaming," Athena, https://www.youtube.com/watch?v=-pb3VJtrBN4, Oct. 16-19, 2022, pp. 1-2.

Sullivan et al., "Overview of the High Efficiency Video Coding (HEVC) Standard," IEEE Transactions on Circuits and Systems for Video Technology, vol. 22, No. 12, Dec. 2012, pp. 1649-1668.

Chen et al., "XGBoost: A Scalable Tree Boosting System," Machine Learing, Mar. 2016, pp. 785-794.

Menon et al., "Content-adaptive Encoder Preset Prediction for Adaptive Live Streaming," arXiv:2210.10330, Oct. 2022, pp. 1-5.

Huangyuan et al., "Performance Evaluation of H.265/MPEG-HEVC Encoders for 4K Video Sequences," APSIPA, 2014, pp. 1-8.

Ioffe et al., "Batch Normalization: Accelerating Deep Network Training by Reducing Internal Covariate Shift," arXiv:1502.03167, Mar. 2015, pp. 1-11.

Zvezdakov et al., "Machine-Learning-Based Method for Content-Adaptive Video Encoding," IEEE Xplore, 2021, pp. 1-5.

Intel Corporation, "Accelerating x265 with Intel Advanced Vector Extensions 512" White Paper, Mar. 2018, pp.

\* cited by examiner

CONTENT-ADAPTIVE ENCODER PRESET PREDICTION FOR ADAPTIVE LIVE STREAMING

BACKGROUND OF INVENTION

HTTP Adaptive Streaming (HAS) has become the de-facto standard in delivering video content for various clients regarding internet speeds and device types. The main idea behind HAS is to divide the video content into segments and encode each segment at various bitrates and resolutions, called representations, which are stored in plain HTTP servers. These representations are stored to continuously adapt the video delivery to the network conditions and device capabilities of the client. Traditionally, a fixed bitrate ladder, e.g., HTTP Live Streaming (HLS) bitrate ladder, is used in live streaming. Furthermore, for every representation, maintaining a fixed encoding speed, which is the same as the video framerate, independent of the video content, is a key goal for a live encoder. Although the compression efficiency (in terms of the obtained quality and bitrate) of the output video is an important metric for the encoder, maintaining the encoding speed takes precedence in the live scenario. This is because a reduction in encoding speed may lead to the unacceptable outcome of dropped frames during transmission, eventually decreasing the Quality of Experience (QoE).

Traditional open-source encoders like x264 (e.g., as described and made available at https://www.videolan.org/developers/x264.html) and x265 (e.g., as described and made available at https://www.videolan.org/developers/x264.html) have pre-defined sets of encoding parameters (termed as pre-sets) which present a trade-off between the encoding time and compression efficiency (see "Choosing an x265 Preset—An ROI Analysis," Oct. 20, 2021, available at https://ottverse.com/choosing-an-x265-preset-an-roi-analysis/)). Typically, the preset for the fastest encoding (ultrafast for x264 and x265) is used as the encoding preset for all live content, independent of the dynamic complexity of the content. Though this conservative technique achieves the intended result of achieving a live encoding, the resulting encode is sub-optimal, especially when the type of the content is dynamically changing, which is the typical use-case for live streams. Furthermore, when the content becomes easier to encode (i.e., slow-moving videos or videos that have simpler textures are easy to encode as predicting the current frame from a previous frame is simpler, resulting in smaller residuals), the encoder would achieve a higher encoding speed than the target encoding speed. This, in turn, introduces unnecessary CPU idle time as it waits for the video feed. If the encoder preset is configured such that this higher encoding speed can be reduced while still being compatible with the expected live encoding speed, the quality of the encoded content achieved by the encoder can be improved. Subsequently, when the content becomes complex again, the encoder preset need to be reconfigured to move back to the faster configuration that achieves live encoding speed.

Furthermore, the encoding speed also depends on the encoding resolution and bitrate. It has been observed that the CPU utilization is poor in the lower bitrate representation encodings (e.g., less than 1 second for 145 kbps to 3400 kbps representations when using ultrafast preset of x265 and eight CPU threads for a 5 second video wherein target encoding is 5 seconds). Therefore, a content-adaptive encoder preset prediction scheme capable of maintaining desired encoding speed and reducing CPU idle time is desirable.

BRIEF SUMMARY

The present disclosure provides techniques for content-adaptive encoder preset prediction. A method for content-adaptive encoder preset prediction for adaptive live streaming may include: performing video complexity feature extraction on a video segment, including extracting a complexity feature of the video segment, the complexity feature comprising one, or a combination, of an average texture energy (E), an average temporal energy (h), and an average lumiscence (L); receiving by an encoding time prediction model a plurality of inputs comprising the complexity feature, a bitrate ladder, a resolution set, a target video encoding speed, and a number of CPU threads for the video segment; predicting an encoding time by an encoding time prediction model using the plurality of inputs; and selecting an optimized encoding preset for the video segment by a preset selection function using the encoding time. In some examples, the encoding time prediction model and the preset selection function comprise a convolutional neural network. In some examples, the bitrate ladder and resolution set are provided in logarithmic scale to the encoding time prediction model. In some examples, the encoding time prediction model is trained on a set of encoder presets for a target encoder, the set of encoder presets ranging from a minimum encoder preset to a maximum encoder preset. In some examples, the encoding time prediction model is trained using a gradient boosting framework. In some examples, selecting the optimized encoding preset comprises selecting a preset such that the encoding time is corresponds to the target video encoding speed. In some examples, the complexity feature comprises a low-complexity spatial feature and a low-complexity temporal feature.

In some examples, the method also includes encoding a plurality of representations of the video segment using the optimized encoding preset. In some examples, the plurality of representations comprises a representation for each bitrate in the bitrate ladder.

A distributed computing system may include: a distributed database configured to store a plurality of video segments, a neural network, a plurality of bitrate ladders, and a codec; and one or more processors configured to: perform video complexity feature extraction on a video segment, including extracting a complexity feature of the video segment, the complexity feature comprising one, or a combination, of an average texture energy (E), an average temporal energy (h), and an average lumiscence (L); receive by an encoding time prediction model a plurality of inputs comprising the complexity feature, a bitrate ladder, a resolution set, a target video encoding speed, and a number of CPU threads for the video segment; predict an encoding time by an encoding time prediction model using the plurality of inputs; and select an optimized encoding preset for the video segment by a preset selection function using the encoding time. In some examples, the neural network is configured to implement the encoding time prediction model. In some examples, the neural network is configured to implement the preset selection function. In some examples, the optimized encoding preset is selected such that the encoding time corresponds to the target video encoding speed. In some examples, the one or more processors are further configured to encode a plurality of representations of the video segment using the optimized encoding preset, each of the plurality of representations corresponding to a bitrate in the bitrate ladder.

A system for content-adaptive encoder preset prediction for adaptive live streaming may include: a processor; and a memory comprising program instructions executable by the processor to cause the processor to implement: an encoding time prediction model configured to predict an encoding time for a video segment using a plurality of inputs comprising the complexity feature, a bitrate ladder, a resolution set, a target video encoding speed, and a number of CPU threads for the video segment; a preset selection function configured to select an optimized encoding preset for the video segment using the encoding time; and an encoder configured to encode the video segment using the optimized encoding preset. In some examples, the encoding time prediction model is trained on a set of encoder presets for a target encoder, the set of encoder presets ranging from a minimum encoder preset to a maximum encoder preset. In some examples, the encoding time prediction model is trained using a gradient boosting framework. In some examples, the encoder comprises a plurality of encoders, each of the plurality of encoders configured to encode the video segment to generate a representation corresponding to a bitrate in the bitrate ladder. In some examples, the preset selection function is configured to select the optimized encoding preset such that the encoding time to correspond with the target video encoding speed.

BRIEF DESCRIPTION OF THE DRAWINGS

Various non-limiting and non-exhaustive aspects and features of the present disclosure are described hereinbelow with references to the drawings, wherein.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to a content-adaptive encoder preset prediction scheme (CAPS) for adaptive live streaming. A CAPS comprises an encoding scheme that determines the encoding preset configuration dynamically, adaptive to video content, to maximize CPU utilization and maximize efficiency of adaptive live streaming for a given target encoding speed. CAPS provides low latency streaming while reducing CPU idle time.

An encoder preset may be determined using Discrete Cosine Transform (DCT)-energy-based low-complexity spatial and temporal features for each of a plurality of video segments, the number of CPU threads allocated for each encoding instance, and the target encoding speed. Using a CAPS may yield an overall quality improvement of approximately 0.83 dB PSNR and 3.81 VMAF or more with the same bitrate, compared to existing fast preset encoding of the HTTP Live Streaming (HLS) bitrate ladder using, for example, x265 HEVC open-source encoder. This may be achieved by maintaining the desired encoding speed and reducing CPU idle time.

A CAPS may be configured to extract (e.g., compute) content-aware features (e.g., DCT-energy-based low-complexity spatial and temporal features) to determine characteristics of a plurality of video segments. Based on these features (i.e., characteristics), encoder presets may be determined for each of a plurality of representations to maintain a target encoding speed.

Figure 1:
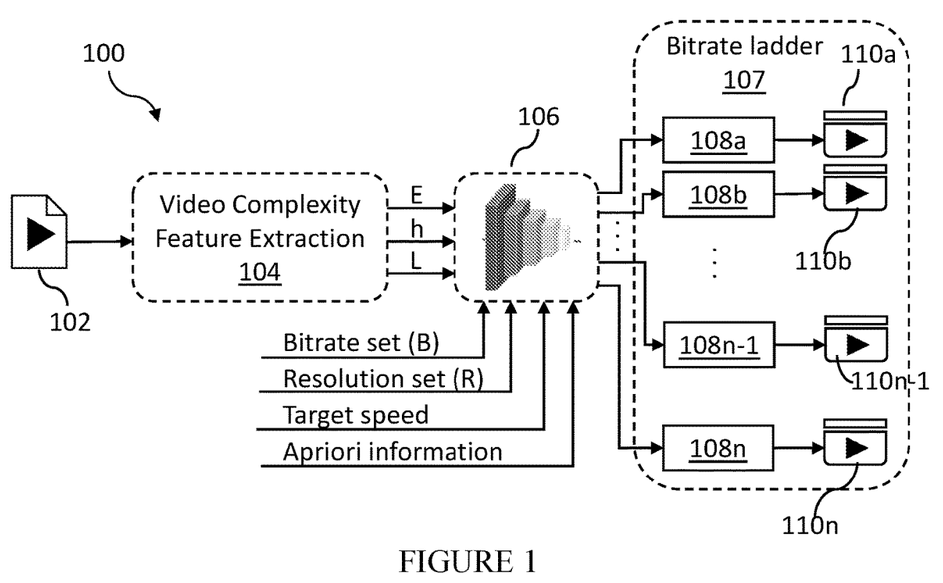
FIG. 1 is a diagram of an exemplary encoding pipeline using a content-adaptive encoder preset prediction scheme, in accordance with one or more embodiments.

FIG. 1 is a diagram of an exemplary encoding pipeline using a content-adaptive encoder preset prediction scheme, in accordance with one or more embodiments. As shown in diagram 100, the encoder preset for each video segment is predicted using the spatial and temporal features (e.g., E, h, and L) for the video segment, the target video encoding speed (f), the number of CPU threads used for encoding (c) and the set of pre-defined resolutions (R) and bitrates (B) of the bitrate ladder. The encoding process is carried out with the predicted encoder preset from the set of supported presets (P) for each video segment. CAPS is classified into two steps: (1) video complexity feature extraction and (2) encoder preset prediction, as described herein. For example, video complexity feature extraction 104 may be configured to extract spatial and temporal features of video segment 102 for encoder preset prediction network 106. In some examples, encoder prediction network 106 may comprise a convolutional neural network (CNN), or other neural network, configured to receive one or a combination of spatial and temporal features of a video segment (e.g., E, h, and L, as described herein), a bitrate set (B), a resolution set (R), a target speed, apriori information (e.g., codec, CPU threads, etc.), and other information in order to predict encoding time for the video segment. In some examples, encoder prediction network 106 also may comprise a preset selection function (e.g., preset selection function 204 in FIG. 2) configured to predict optimized encoding presets. One or both of the predicted encoding time and optimized encoding presets may be provided to encoders 108a-108n for encoding the video segment for n bitrates in bitrate ladder 107, thereby generating representations 110a-110n.

Video Complexity Feature Extraction

In live streaming applications, selecting low-complexity features is critical to ensure low-latency video streaming without disruptions. In an example, an optimized encoder preset ($\bar{p}$) may be determined as a function of three DCT-energy-based features: (i) an average texture energy (E), (ii) an average gradient of the texture energy (i.e., average temporal energy) (h), and (iii) an average luminescence (L). Inputs also may include a target bitrate (b), resolution (r), a target video encoding speed (f) and a number of CPU threads used for encoding (c).

The three DCT-energy-based features are determined as follows. The block-wise texture of each frame is defined as:

$$H_{s,k} = \sum_{i=0}^{w-1}\sum_{j=0}^{w-1} e^{\left|\left(\frac{ij}{w^2}\right)^2 - 1\right|} |DCT(i,j)|$$

where k is the block address in the $s^{th}$ frame, w×w pixels indicates the size of the block, and DCT(i,j) is the $(i,j)^{th}$ DCT component when i+j>0, and 0 otherwise. An average texture energy may be calculated as follows:

$$E = \sum_{s=0}^{S-1}\sum_{k=0}^{K-1} \frac{H_{s,k}}{S \cdot K \cdot w^2}$$

where K represents a number of blocks per frame, and S denotes a number of frames in the segment. Furthermore, the average temporal energy (h) is defined as follows:

$$h = \sum_{s=1}^{S-1}\sum_{k=0}^{K-1} \frac{|H_{s,k} - H_{s-1,k}|}{(S-1) \cdot K \cdot w^2}$$

The luminescence of non-overlapping blocks of k of $s^{th}$ frame is defined as:

$$L_{s,k} = \sqrt{DCT(0,0)}$$

where DCT (0,0) is the DC component in the DCT calculation. The block-wise luminescence is averaged per segment denoted as L as shown below:

$$L = \sum_{s=0}^{S-1}\sum_{k=0}^{K-1} \frac{L_{p,k}}{P \cdot K \cdot w^2}$$

Encoding Preset Prediction

Figure 2:
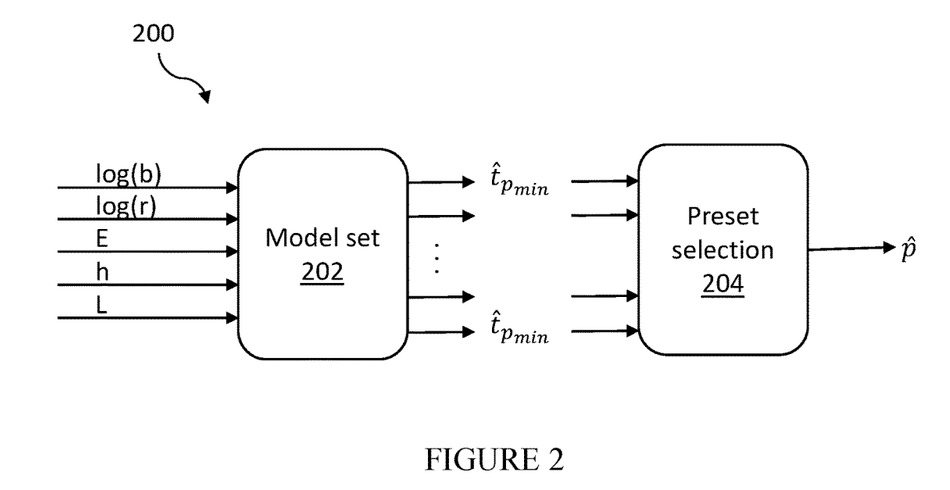
FIG. 2 is a simplified block diagram of an exemplary content-adaptive encoder preset prediction scheme architecture, in accordance with one or more embodiments.

FIG. 2 is a simplified block diagram of an exemplary content-adaptive encoder preset prediction scheme architecture, in accordance with one or more embodiments. As shown in diagram 200, selecting an optimized encoding preset based on resolution, bitrate, and video complexity may be achieved in two parts: (i) designing models to predict the encoding time for each corresponding input, and (ii) developing a function to obtain the optimized preset based on the predicted encoding times for each available encoding preset. Model set 202 and preset selection function 204 may be parts of an encoder prediction network (e.g., encoder prediction network 106). Inputs to model set 202 (e.g., an encoding time prediction model designed for a given encoder, which may comprise a CNN as described herein) may comprise a number of CPU threads for encoding (c), a target encoding speed (f), complexity metrics (e.g., E, h, and L), resolution (r), and bitrate (b). In some examples, r and b may be input to model set 202 in logarithmic scale to reduce internal covariate shift. In some examples, additional inputs may be provided to model set 202, such as a codec. Model set 202 may be trained to predict encoding times for a pre-defined set of encoding presets (P). The minimum and maximum encoder preset ($p_{min}$ and $p_{max}$, respectively) are chosen based on the target encoder. For example, x.265 HECV encoder supports encoding presets ranging from 0 to 9 (e.g., ultrafast to placebo). Model set 202 may predict encoding times for each of the presets in P as $\hat{t}_{p_{min}}$ to $\hat{t}_{p_{max}}$. The predicted encoding times may be provided to preset selection function 204, which may be configured to choose an optimized encoding preset to ensure that the encoding time corresponds a target video encoding speed, as closely as possible (e.g., matching the encoding time to the target video encoding speed). This is accomplished by selecting the preset which is closest to the target encoding time T, which may be defined as:

$$T = \frac{n}{f}$$

where n represents the number of frames in the segment. The function also may be configured to ensure that the encoding time is not greater than the target encoding time T. This can be represented mathematically as follows:

$$\hat{t} = \arg\min_p |T - t_p| c.t. p \in [p_{min}, p_{max}]; \hat{t} \leq T$$

where $\hat{p}$ is a selected optimized preset and t is an encoding time for p.

In some examples, a gradient boosting framework (e.g., XGBoost algorithm, other implementation of a gradient boosted decision tree with a similar or appropriate level of speed and performance) may be used to train models for various resolution and bitrate combinations in the bitrate ladder to predict the encoding time based on the complexity of the video, the resolution and bitrate, which in turn, facilitates the selection of the optimized encoding preset. In an example using XGBoost, the input vector passed to the network (e.g., neural network) may be [E, h, L, log(r), log (b)]. In other examples, any efficient, flexible, scalable machine learning model may be used. The output to be predicted is the encoding time t. The model may be designed to obtain encoding time predictions pertaining to each preset from $p_{min}$ to $p_{max}$ for each input. In the XGBoost example above, this is a regression task, the loss function employed is mean squared error, which is the default loss function for regression in XGBoost models.

An example training process of a network is shown in Algorithm 1:

Algorithm 1: Neural network training

Inputs:
    $p_{min}$: minimum supported encoder preset
    $p_{max}$: maximum supported encoder preset
for each training segment do
|     Determine E, h
|     for each b ∈ B do
|     |     for each p ∈ [$p_{min}$, $p_{max}$] do
|     |     |     Encode segment with encoder preset p ;
|     |     |_ Record the achieved encoding speed $\hat{f}$ ;
|     |_ Choose $\hat{p}$ which yields $\hat{f}$ close to f.
|_
Feed [E, h, log(b)] and $\hat{p}$ values to the network For each bitrate-resolution pair, the set of models predicts the encoding times (e.g., in seconds) for each preset in P. The predicted encoding times for each preset are input to preset selection function 204, which may select an optimized preset to ensure that the encoding time corresponds to the target video encoding speed as closely as possible (e.g., matching the encoding time to the target video encoding speed).

Figure 3:
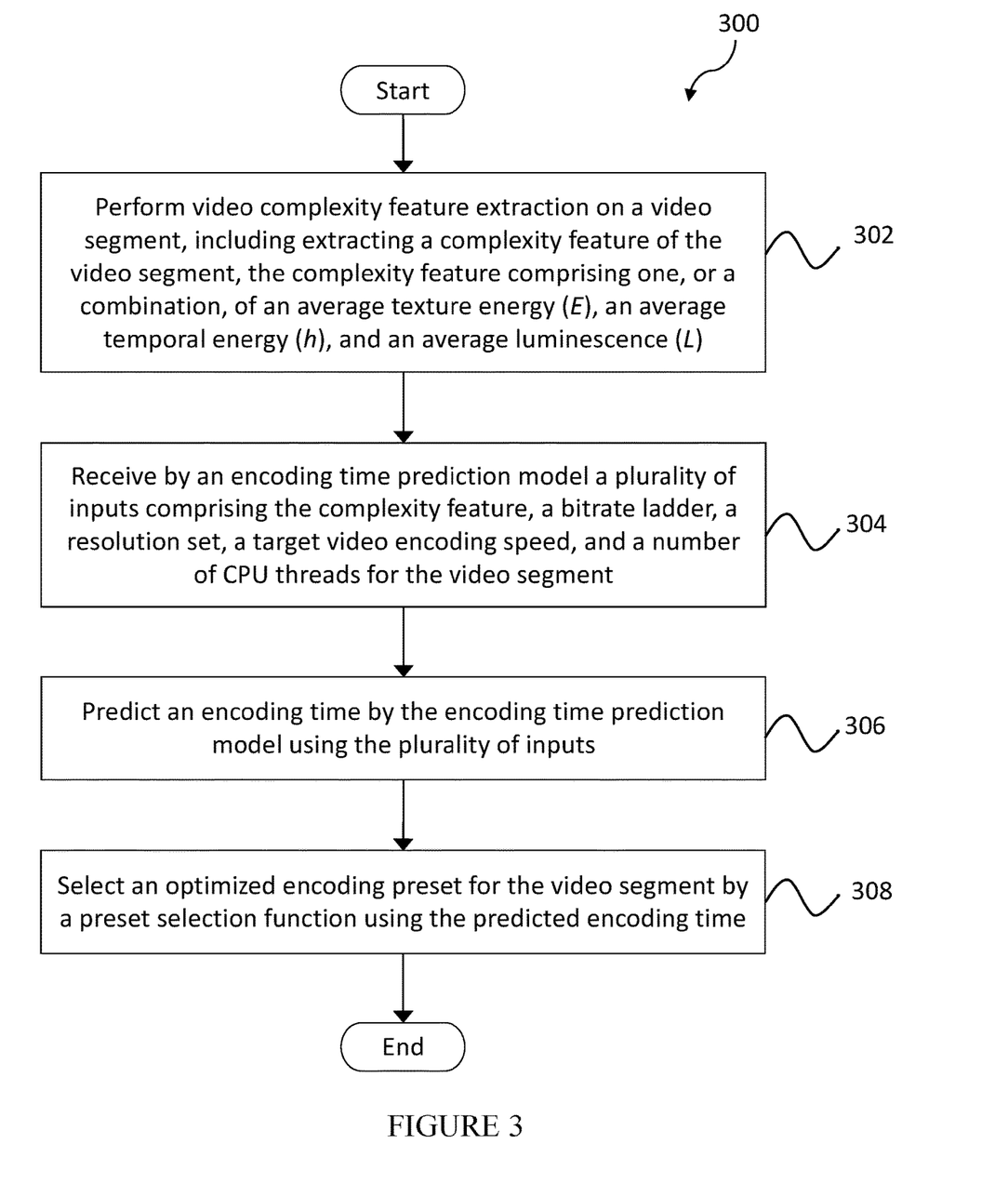
FIG. 3 is a flow diagram illustrating an exemplary method for content-adaptive encoder preset prediction, in accordance with one or more embodiments.

FIG. 3 is a flow diagram illustrating an exemplary method for content-adaptive encoder preset prediction, in accordance with one or more embodiments. Method 300 begins with performing video complexity feature extraction on a video segment, at step 302, including extracting a complexity feature of the video segment, the complexity feature comprising one, or a combination, of an average texture energy (E), an average temporal energy (h), and an average luminescence (L). In some examples, said complexity feature extraction may be performed using the equations and algorithms described herein. A plurality of inputs may be received by an encoding time prediction model at step 304, the plurality of inputs comprising the complexity feature (e.g., E, h, and L from the video complexity feature extraction), a bitrate ladder (B), a resolution set (R), a target video encoding speed (f), and a number of CPU threads for the video segment. Other characteristics may be received as well, such as a codec. An encoding time may be predicted by the encoding time prediction model (e.g., a neural network, other machine learning model, as described herein) at step 306 using the plurality of inputs. In an example, an input vector provided to the network may include [E, h, L, log(r), log (b)]. In some examples, the neural network may be trained according to Algorithm 1 above. An optimized encoding preset for the video segment may be selected by a preset selection function using the predicted encoding time at step 308.

Figure 4A:
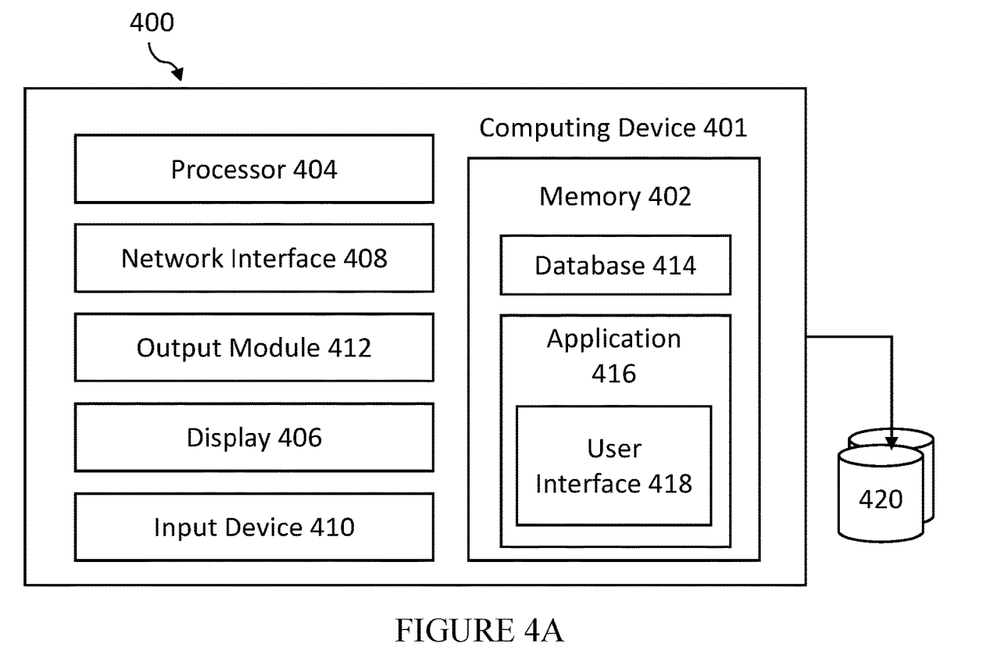
FIG. 4A is a simplified block diagram of an exemplary computing system configured to perform steps of the method illustrated in FIG. 3 and to implement the networks illustrated in FIGS. 1-2, in accordance with one or more embodiments.

FIG. 4A is a simplified block diagram of an exemplary computing system configured to perform steps of the method illustrated in FIG. 3 and to implement the networks illustrated in FIGS. 1-2, in accordance with one or more embodiments. In one embodiment, computing system 400 may include computing device 401 and storage system 420. Storage system 420 may comprise a plurality of repositories and/or other forms of data storage, and it also may be in communication with computing device 401. In another embodiment, storage system 420, which may comprise a plurality of repositories, may be housed in one or more of computing device 401. In some examples, storage system 420 may store video data (e.g., frames, resolutions, and the like), neural networks (e.g., trained), codecs, features, instructions, programs, and other various types of information as described herein. This information may be retrieved or otherwise accessed by one or more computing devices, such as computing device 401, in order to perform some or all of the features described herein. Storage system 420 may comprise any type of computer storage, such as a hard-drive, memory card, ROM, RAM, DVD, CD-ROM, write-capable, and read-only memories. In addition, storage system 420 may include a distributed storage system where data is stored on a plurality of different storage devices, which may be physically located at the same or different geographic locations (e.g., in a distributed computing system such as system 450 in FIG. 4B). Storage system 420 may be networked to computing device 401 directly using wired connections and/or wireless connections. Such network may include various configurations and protocols, including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

Computing device 401 also may include a memory 402. Memory 402 may comprise a storage system configured to store a database 414 and an application 416. Application 416 may include instructions which, when executed by a processor 404, cause computing device 401 to perform various steps and/or functions, as described herein. Application 416 further includes instructions for generating a user interface 418 (e.g., graphical user interface (GUI)). Database 414 may store various algorithms and/or data, including neural networks and data regarding video data and feature maps, among other types of data. Memory 402 may include any non-transitory computer-readable storage medium for storing data and/or software that is executable by processor 404, and/or any other medium which may be used to store information that may be accessed by processor 404 to control the operation of computing device 401.

Computing device 401 may further include a display 406, a network interface 408, an input device 410, and/or an output module 412. Display 406 may be any display device by means of which computing device 401 may output and/or display data. Network interface 408 may be configured to connect to a network using any of the wired and wireless short range communication protocols described above, as well as a cellular data network, a satellite network, free space optical network and/or the Internet. Input device 410 may be a mouse, keyboard, touch screen, voice interface, and/or any or other hand-held controller or device or interface by means of which a user may interact with computing device 401. Output module 412 may be a bus, port, and/or other interface by means of which computing device 401 may connect to and/or output data to other devices and/or peripherals.

In one embodiment, computing device 401 is a data center or other control facility (e.g., configured to run a distributed computing system as described herein), and may communicate with a media playback device. As described herein, system 400, and particularly computing device 401, may be used for implementing CAPS, as described herein. Various configurations of system 400 are envisioned, and various steps and/or functions of the processes described herein may be shared among the various devices of system 400 or may be assigned to specific devices.

Figure 4B:
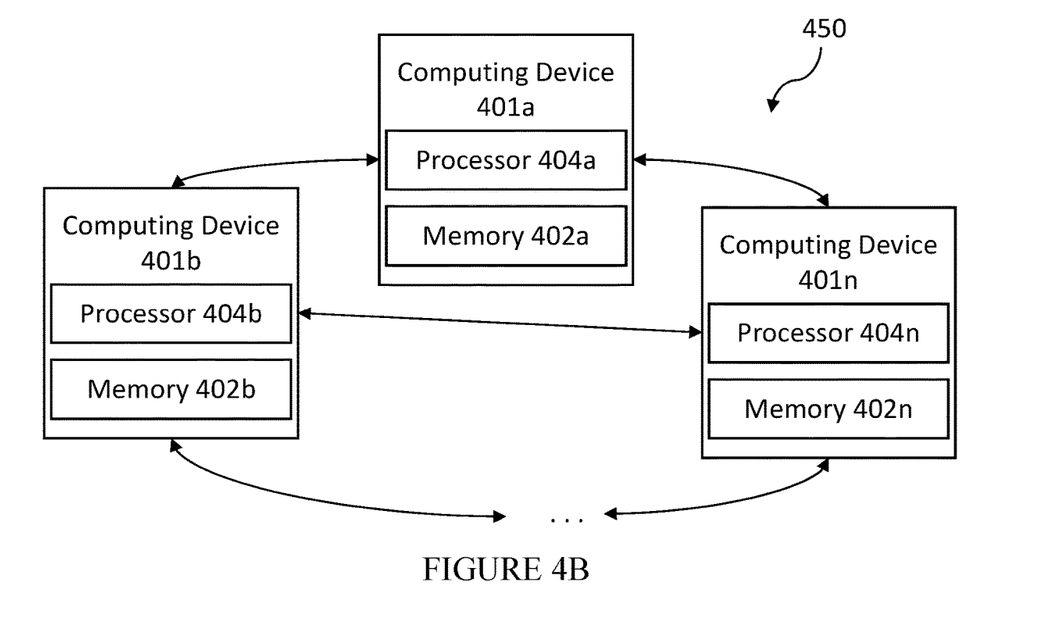
FIG. 4B is a simplified block diagram of an exemplary distributed computing system implemented by a plurality of the computing devices, in accordance with one or more embodiments.

FIG. 4B is a simplified block diagram of an exemplary distributed computing system implemented by a plurality of the computing devices, in accordance with one or more embodiments. System 450 may comprise two or more computing devices 401a-n. In some examples, each of 401a-n may comprise one or more of processors 404a-n, respectively, and one or more of memory 402a-n, respectively. Processors 404a-n may function similarly to processor 404 in FIG. 4A, as described above. Memory 402a-n may function similarly to memory 402 in FIG. 4A, as described above.

Figure 5A:
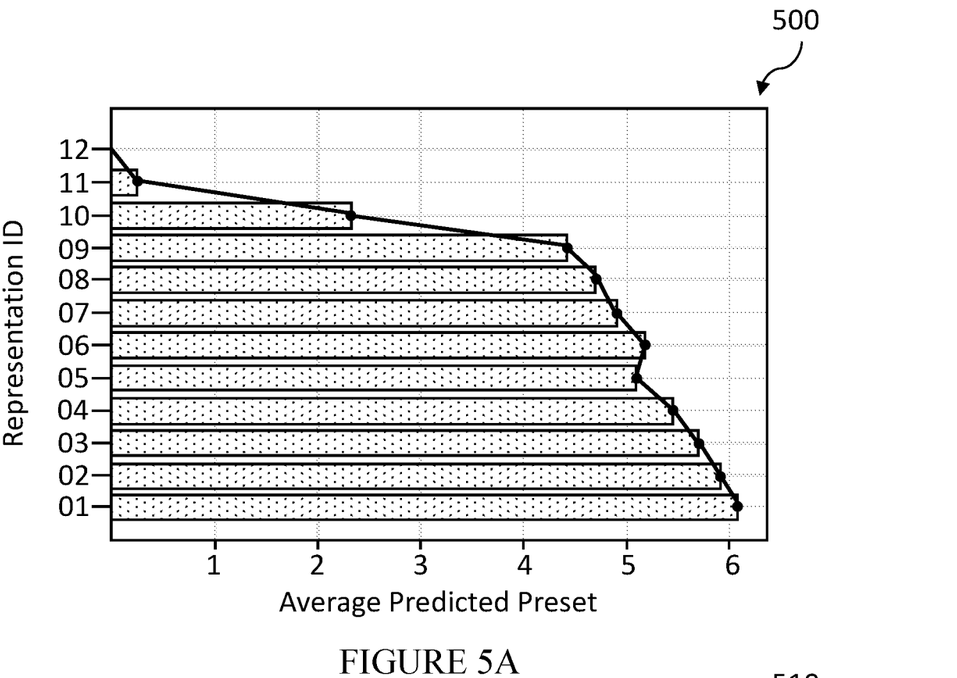
FIG. 5A-5B are charts showing exemplary average predicted presets and encoding times by a content-adaptive encoder preset prediction scheme, in accordance with one or more embodiments.
Figure 5B:
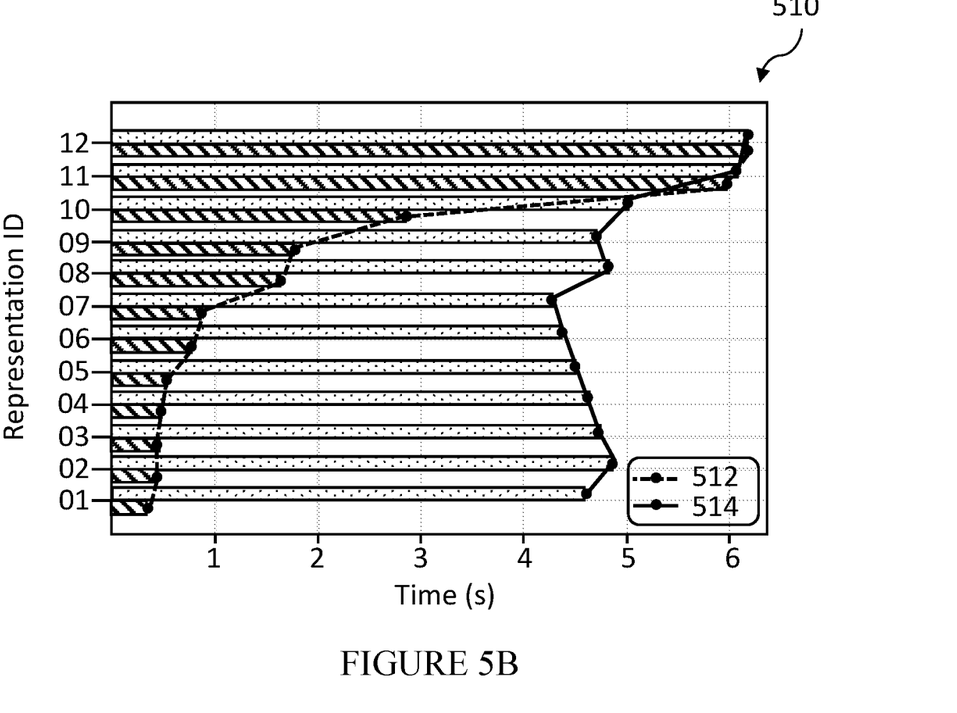

FIG. 5A-5B are charts showing exemplary average predicted presets and encoding times by a content-adaptive encoder preset prediction scheme, in accordance with one or more embodiments. In this example, four hundred sequences representing 80% of a video complexity dataset are used as a training dataset, a remaining 20% used as a test dataset. Sequences were encoded at 24 fps using x265 v3.5 (i.e., T=5 seconds) with presets defined in x265: 0 (ultrafast) to 8 (veryslow) wherein each encoding instance uses 8 CPU threads with multi-threading and x86 SIMD optimizations. DCT-energy-based features, E, h, and L may be extracted (e.g., computed) using, for example, video content analysis (VCA) running as a pre-processor using 8 CPU threads with multi-threading and x86 optimizations. An exemplary bitrate ladder may comprise:

| Representation ID | 01 | 02 | 03 | 04 | 05 | 06 | 07 | 08 | 09 | 10 | 11 | 12 |
|---|---|---|---|---|---|---|---|---|---|---|---|---|
| r (width in pixels) | 360 | 432 | 540 | 540 | 540 | 720 | 720 | 1080 | 1080 | 1440 | 2160 | 2160 |
| b (kbps) | 145 | 300 | 600 | 900 | 1600 | 2400 | 3400 | 4500 | 5800 | 8100 | 11600 | 16800 |

FIG. 5A shows an example set of average presets chosen for each representation of an HLS bitrate ladder across the test dataset. On average in chart 500, 145 kbps representation chooses slow preset (p=6), while 11.6 Mbps and 16.8 Mbps representations choose ultrafast preset (p=0). FIG. 5B shows the average encoding time for every representation in the bitrate ladder using ultrafast preset (i.e., times 512) as compared with CAPS (i.e., times 514). On average in chart 510, 11.6 Mbps and 16.8 Mbps representations take more than 5 seconds for encoding using ultrafast preset. For other representations, encodings are likely to finish within the bound of T=5 seconds. As shown, using ultrafast preset for all representations introduces significant CPU idle time for lower bitrate representations, whereas the CAPS method described herein yields lower CPU idle time when encodings are carried out concurrently.

Figure 6A:
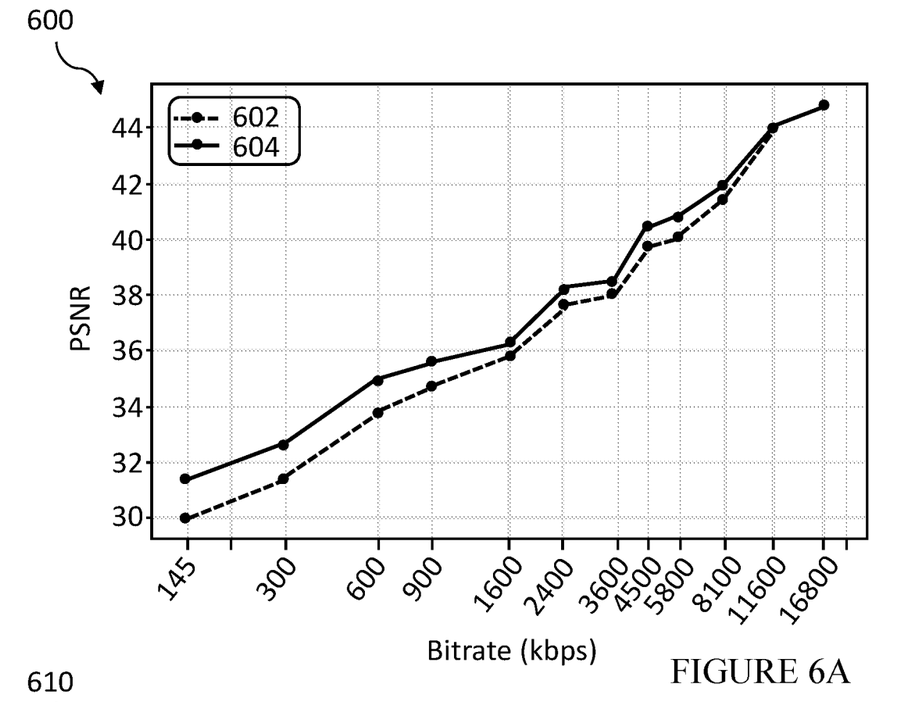
FIGS. 6A-6B are charts showing exemplary QoE using a content-adaptive encoder preset prediction scheme, in accordance with one or more embodiments.
Figure 6B:
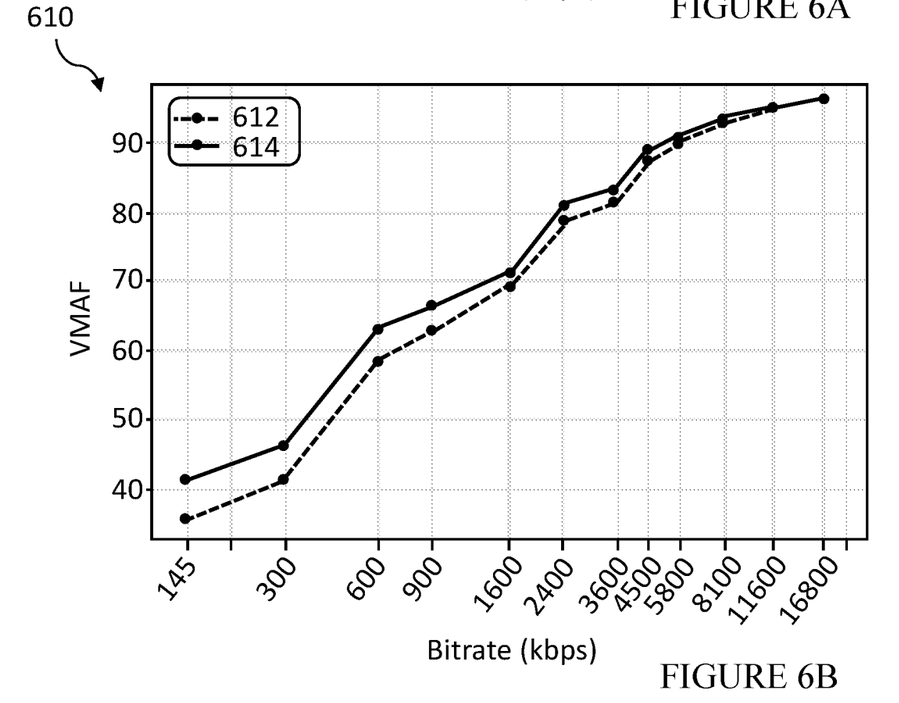

FIGS. 6A-6B are charts showing exemplary QoE using a content-adaptive encoder preset prediction scheme, in accordance with one or more embodiments. Each representation's average Peak Signal to Noise Ratio (PSNR) and Video Multimethod Assessment Fusion (VMAF) are shown in FIGS. 6A-6B. In these examples, an example comparison of resulting quality (e.g., QoE) between CAPS (e.g., lines 604 and 614) and ultrafast (e.g., lines 602 and 612) preset encoding with the same bitrates are shown for each test sequence. The quality of video improves significantly at lower bitrate representations using CAPS, yielding an overall BD-VMAF of approximately 3.81 and BD-PSNR of approximately 0.83 dB.

While specific examples have been provided above, it is understood that the present invention can be applied with a wide variety of inputs, thresholds, ranges, and other factors, depending on the application. For example, the time frames, rates, ratios, and ranges provided above are illustrative, but one of ordinary skill in the art would understand that these time frames and ranges may be varied or even be dynamic and variable, depending on the implementation.

As those skilled in the art will understand a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

Examples of computer-readable storage mediums include a read only memory (ROM), random-access memory (RAM), a register, cache memory, semiconductor memory devices, magnetic media such as internal hard disks and removable disks, magneto-optical media, and optical media such as CD-ROM disks.

Suitable processors include, by way of example, a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, or any combination of thereof.

What is claimed is:

1. A method for content-adaptive encoder preset prediction for adaptive live streaming, the method comprising:
   performing video complexity feature extraction on a video segment, including extracting a complexity feature of the video segment, the complexity feature comprising one, or a combination, of an average texture energy (E), an average temporal energy (h), and an average lumiscence (L);
   receiving by an encoding time prediction model a plurality of inputs comprising the complexity feature, a bitrate ladder, a resolution set, a target video encoding speed, and a number of CPU threads for the video segment;
   predicting an encoding time by an encoding time prediction model using the plurality of inputs; and
   selecting an optimized encoding preset for the video segment by a preset selection function using the encoding time.

2. The method of claim 1, wherein the encoding time prediction model and the preset selection function comprise a convolutional neural network.

3. The method of claim 1, wherein the bitrate ladder and resolution set are provided in logarithmic scale to the encoding time prediction model.

4. The method of claim 1, wherein the encoding time prediction model is trained on a set of encoder presets for a target encoder, the set of encoder presets ranging from a minimum encoder preset to a maximum encoder preset.

5. The method of claim 1, wherein the encoding time prediction model is trained using a gradient boosting framework.

6. The method of claim 1, wherein selecting the optimized encoding preset comprises selecting a preset such that the encoding time is corresponds to the target video encoding speed.

7. The method of claim 1, wherein the complexity feature comprises a low-complexity spatial feature and a low-complexity temporal feature.

8. The method of claim 1, further comprising encoding a plurality of representations of the video segment using the optimized encoding preset.

9. The method of claim 8, wherein the plurality of representations comprises a representation for each bitrate in the bitrate ladder.

10. A distributed computing system comprising:
   a distributed database configured to store a plurality of video segments, a neural network, a plurality of bitrate ladders, and a codec; and
   one or more processors configured to:
      perform video complexity feature extraction on a video segment, including extracting a complexity feature of the video segment, the complexity feature comprising one, or a combination, of an average texture energy (E), an average temporal energy (h), and an average lumiscence (L);

receive by an encoding time prediction model a plurality of inputs comprising the complexity feature, a bitrate ladder, a resolution set, a target video encoding speed, and a number of CPU threads for the video segment;

predict an encoding time by an encoding time prediction model using the plurality of inputs; and select an optimized encoding preset for the video segment by a preset selection function using the encoding time.

11. The distributed computing system of claim 10, wherein the neural network is configured to implement the encoding time prediction model.

12. The distributed computing system of claim 10, wherein the neural network is configured to implement the preset selection function.

13. The distributed computing system of claim 10, wherein the optimized encoding preset is selected such that the encoding time corresponds to the target video encoding speed.

14. The distributed computing system of claim 10, wherein the one or more processors are further configured to encode a plurality of representations of the video segment using the optimized encoding preset, each of the plurality of representations corresponding to a bitrate in the bitrate ladder.

15. A system for content-adaptive encoder preset prediction for adaptive live streaming, the system comprising:

a processor; and a memory comprising program instructions executable by the processor to cause the processor to implement:

an encoding time prediction model configured to predict an encoding time for a video segment using a plurality of inputs comprising the complexity feature, a bitrate ladder, a resolution set, a target video encoding speed, and a number of CPU threads for the video segment;

a preset selection function configured to select an optimized encoding preset for the video segment using the encoding time; and an encoder configured to encode the video segment using the optimized encoding preset.

16. The system of claim 15, wherein the encoding time prediction model is trained on a set of encoder presets for a target encoder, the set of encoder presets ranging from a minimum encoder preset to a maximum encoder preset.

17. The system of claim 15, wherein the encoding time prediction model is trained using a gradient boosting framework.

18. The system of claim 15, wherein the encoder comprises a plurality of encoders, each of the plurality of encoders configured to encode the video segment to generate a representation corresponding to a bitrate in the bitrate ladder.

19. The system of claim 15, wherein the preset selection function is configured to select the optimized encoding preset such that the encoding time to correspond with the target video encoding speed.

* * * * *